United States Patent
Chen et al.

(10) Patent No.: US 10,321,054 B2
(45) Date of Patent: Jun. 11, 2019

(54) PANORAMIC IMAGE STITCHING METHOD FOR REDUCING GEOMETRIC DISTORTION BY USING AN IMAGE REGISTRATION PROCESS AND SYSTEM THEREOF

(71) Applicant: WELTREND SEMICONDUCTOR INC., Hsinchu (TW)

(72) Inventors: Hsuan-Ying Chen, Hsinchu (TW); Hung-Chih Chiang, Hsinchu (TW); Shui-Chin Yeh, Hsinchu (TW); Ming-Liang Chen, Hsinchu (TW)

(73) Assignee: WELTREND SEMICONDUCTOR INC., Hsinchu (TW)

( * ) Notice: Subject to any disclaimer, the term of this patent is extended or adjusted under 35 U.S.C. 154(b) by 46 days.

(21) Appl. No.: 15/723,170

(22) Filed: Oct. 3, 2017

(65) Prior Publication Data
US 2018/0316857 A1    Nov. 1, 2018

(30) Foreign Application Priority Data
Apr. 26, 2017 (TW) .............................. 106113896 A

(51) Int. Cl.
*H04N 5/00* (2011.01)
*H04N 5/232* (2006.01)
(Continued)

(52) U.S. Cl.
CPC ....... *H04N 5/23238* (2013.01); *G06T 3/4038* (2013.01); *G06T 5/006* (2013.01);
(Continued)

(58) Field of Classification Search
CPC .............................. G06T 17/00; G06T 3/0062
See application file for complete search history.

(56) References Cited

U.S. PATENT DOCUMENTS 5,960,108 A * 9/1999 Xiong ................... G06T 3/0062
                                                         382/154
7,489,335 B2 * 2/2009 Kochi .................... H04N 5/217
                                                         348/180
(Continued)

FOREIGN PATENT DOCUMENTS

CN      102045546 A     5/2011
TW      201537510 A     10/2015
(Continued)

OTHER PUBLICATIONS (Arfaoui et al. Fisheye lens calibration using virtual grid, Apr. 20, 2013 / vol. 52, No. 12 / Applied Optics.*

*Primary Examiner* — Frank F Huang
(74) *Attorney, Agent, or Firm* — Winston Hsu

(57) ABSTRACT

A panoramic image stitching method includes acquiring a plurality of first images, converting camera image plane coordinates of each first image of the plurality of first images into virtual image plane coordinates for generating a second image according a world coordinate system, identifying a plurality of feature points on the second image, calibrating coordinates of the plurality of feature points on the second image, generating a calibrated second image according to calibrated coordinates of the plurality of feature points on the second image, and stitching a plurality of calibrated second images for generating a panoramic image.

10 Claims, 9 Drawing Sheets

(51) Int. Cl.
  *G06T 3/40* (2006.01)
  *G06T 5/00* (2006.01)
  *G06T 7/33* (2017.01)
  *H04N 17/00* (2006.01)

(52) U.S. Cl.
  CPC .......... *G06T 7/33* (2017.01); *H04N 5/23232* (2013.01); *H04N 17/002* (2013.01); *G06T 2200/32* (2013.01); *G06T 2207/30252* (2013.01); *H04N 5/23229* (2013.01)

(56) References Cited

U.S. PATENT DOCUMENTS

| | | | |
|---|---|---|---|
| 7,499,586 B2 | 3/2009 | Agarwala | |
| 8,368,762 B1* | 2/2013 | Chen | H04N 17/002 348/187 |
| 8,907,989 B2* | 12/2014 | Fukasawa | G06K 9/00771 345/660 |
| 9,105,080 B2* | 8/2015 | McAndrew | G06T 7/80 |
| 9,445,011 B2* | 9/2016 | Zhang | B60R 1/088 |
| 9,754,161 B2* | 9/2017 | Levy | G06F 3/017 |
| 2014/0193034 A1* | 7/2014 | Oami | G06K 9/00362 382/103 |

FOREIGN PATENT DOCUMENTS

| | | |
|---|---|---|
| TW | 201610471 A | 3/2016 |
| TW | M520036 U | 4/2016 |

\* cited by examiner

PANORAMIC IMAGE STITCHING METHOD FOR REDUCING GEOMETRIC DISTORTION BY USING AN IMAGE REGISTRATION PROCESS AND SYSTEM THEREOF

BACKGROUND OF THE INVENTION

1. Field of the Invention

The present invention illustrates a panoramic image stitching method, and more particularly, a panoramic image stitching method by using an image registration process in order to improve image quality of the panoramic image.

2. Description of the Prior Art

With advancements of techniques, various image monitoring devices and image recognition systems are popularly adopted in our daily life. The image monitoring devices and the image recognition systems can perform an operation for monitoring an object, an operation for monitoring surrounding environment, or an operation for recording an event data. To achieve satisfactory monitoring performance without introducing any blind spot, images captured by several lenses can be stitched by using the image monitoring device to generate a panoramic image. The image monitoring device can also use a single lens to capture several images with different angles of view. Then, the images with different angles of view can be stitched to generate the panoramic image. Particularly, the panoramic image can have an angle of view equal to 360 degrees.

However, some drawbacks are introduced when the images captured by the single lens are stitched to generate the panoramic image. For example, the single lens requires a lot of time for capturing the images with different angles of view. Thus, a real time process for generating the panoramic image is unachievable. Further, although it requires a short time for capturing the images with different angles of view by using several lenses, a ghost effect (or say, double-image blur effect) may be introduced when the panoramic image is generated by stitching these images since each image has its own image distortion. Thus, when the double-image blur effect is introduced to the panoramic image, an object of the panoramic image cannot be identified. Also, some blind spots may appear to the panoramic image, thereby increasing a risk of monitoring error and reducing monitoring reliability.

SUMMARY OF THE INVENTION

In an embodiment of the present invention, a panoramic image stitching method is disclosed. The panoramic image stitching method comprises acquiring a plurality of first images, converting camera coordinates of each first image to image coordinates according to a world coordinate system, generating a second image according to the image coordinates, identifying a plurality of feature points of the second image, calibrating coordinates of the plurality of feature points of the second image for generating calibrated coordinates of the plurality of feature points of the second image according to the world coordinate system, generating a calibrated second image according to the calibrated coordinates of the plurality of feature points of the second image, and stitching a plurality of calibrated second images for generating a panoramic image.

In another embodiment of the present invention, a panoramic image system is disclosed. The panoramic image system comprises a plurality of image capturing devices configured to acquire a plurality of first images, a memory configured to save data of a world coordinate system, a processor coupled to the plurality of image capturing devices and the memory and configured to process the plurality of first images, and an image output device coupled to the processor and configured to output a panoramic image. The processor converts the plurality of first images to a plurality of second images according to the world coordinate system, identifies a plurality of feature points of each second image, calibrates coordinates of the plurality of feature points of the second image according to the world coordinate system, generates a calibrated second image according to calibrated coordinates, and stitches a plurality of calibrated second images for generating a panoramic image accordingly.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
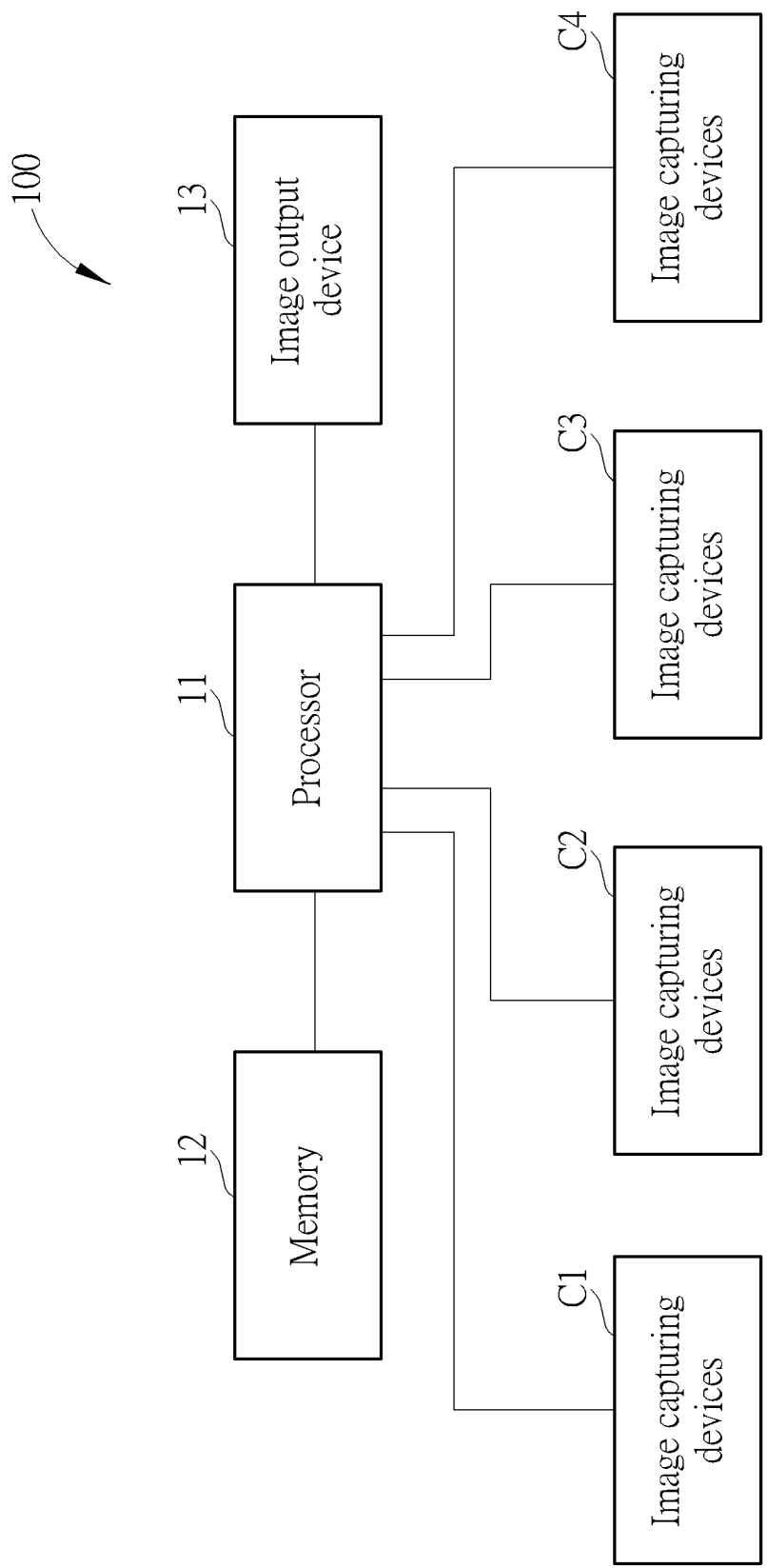
FIG. 1 is a block diagram of a panoramic image system according to an embodiment of the present invention.

FIG. 1 is a block diagram of a panoramic image system 100 according to an embodiment of the present invention. The panoramic image system 100 includes a plurality of image capturing devices C1 to C4, a processor 11, a memory 12, and an image output device 13. The plurality of image capturing devices C1 to C4 are used for acquiring a plurality of first images. The plurality of image capturing devices C1 to C4 of the panoramic image system 100 can be camera lenses, video recorders, or wide-angle lenses of a vehicle. The panoramic image system 100 is not limited to use four image capturing devices C1 to C4. For example, the panoramic image system 100 can use N image capturing devices for capturing images. N is a positive integer greater than one. Here, each image capturing device of the image capturing devices C1 to C4 can capture an image with an angle of view greater than (360/4) degrees. The memory 12 is used for saving data of a world coordinate system and a lookup table. The memory 12 can be any data storage device, such as a random access memory, a hard disc, or a non-volatile memory. The processor 11 is coupled to the plurality of image capturing devices C1 to C4 and the memory 12 for processing each first image captured by a corresponding image capturing device. The processor 11 can be any data processing device, such as a central processing unit, a micro-processor, a processing chip, or a programmable logic unit. The processor 11 can convert the first images captured by the plurality of image capturing devices C1 to C4 to second images consistent with the world coordinate system by using the world coordinate system and the lookup table saved in the memory 12. Further, the processor 11 can perform an image registration process for stitching the second images in order to generate a panoramic image. The image processing method is illustrated later. The image output device 13 is coupled to the processor 11 for outputting the panoramic image. The image output device 13 can be any display or image projecting device. A user can see a surrounded top view panoramic image displayed on the image output device 13.

Figure 2:
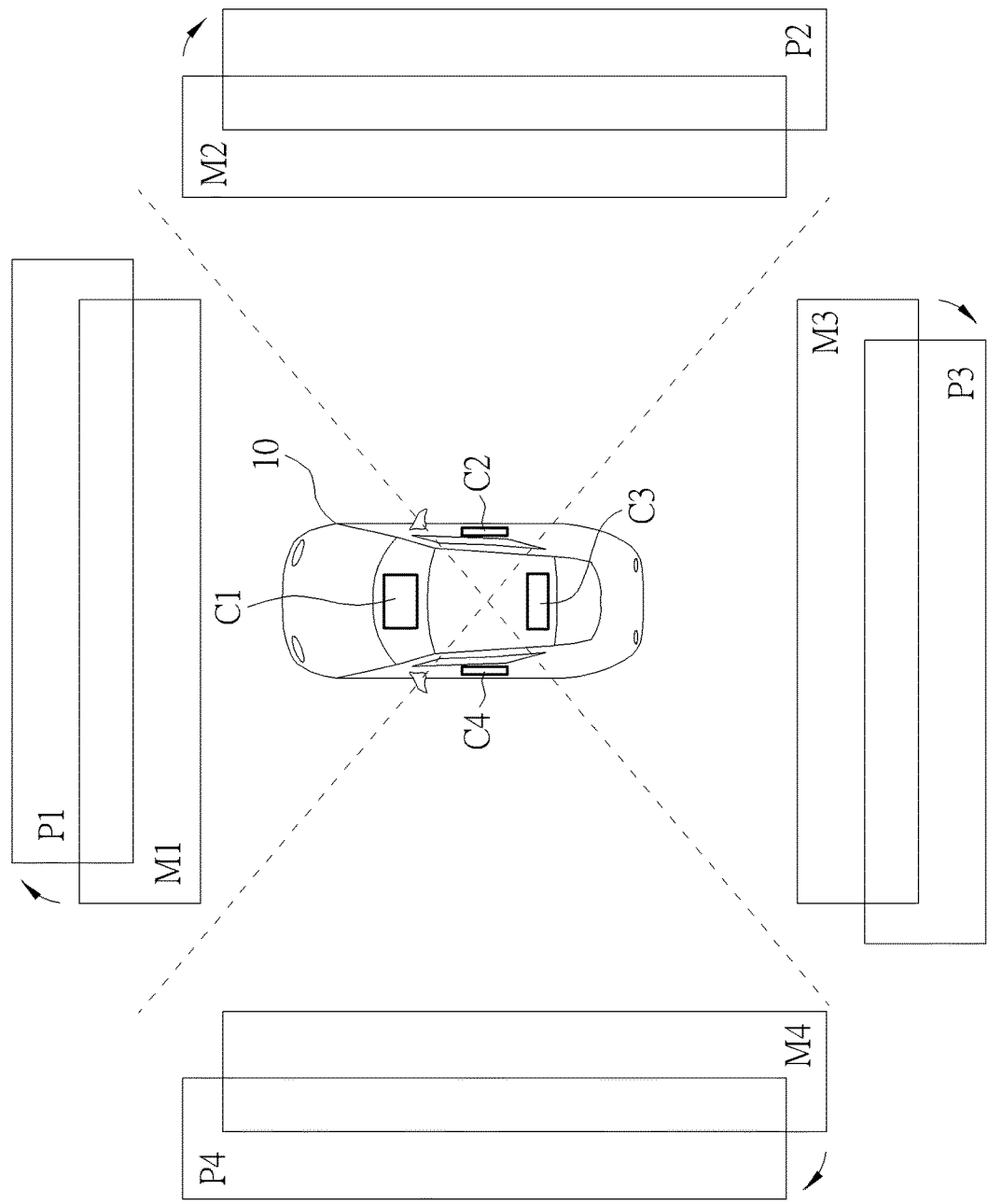
FIG. 2 is an illustration when the panoramic image system in FIG. 1 is applied to a vehicle for monitoring surrounded environment.

FIG. 2 is an illustration when the panoramic image system 100 is applied to a vehicle 10 for monitoring surrounded environment. The panoramic image system 100 can be applied to any hardware system. In FIG. 2, when the panoramic image system 100 is applied to the vehicle 10, the image capturing devices C1 to C4 can be disposed inside the vehicle 10 and faced in four different directions. For example, the image capturing device C1 can be disposed on a front side of the vehicle 10 for capturing a first image M1 corresponding to the front side of the vehicle 10. The image capturing device C2 can be disposed on a right side of the vehicle 10 for capturing a first image M2 corresponding to the right side of the vehicle 10. The image capturing device C3 can be disposed on a back side of the vehicle 10 for capturing a first image M3 corresponding to the back side of the vehicle 10. The image capturing device C4 can be disposed on a left side of the vehicle 10 for capturing a first image M4 corresponding to the left side of the vehicle 10. When the first images M1 to M4 are captured by the panoramic image system 100, the processor 11 can perform a coordinate conversion process for generating second images P1 to P4. In the following, the coordinate conversion process from the first image M1 to the second image P1 is described. As previously mentioned, since the image capturing device C1 can directly capture the first image M1, the first image M1 may be inherently tilted due to a height of the image capturing device C1, a view angle of the image capturing device C1, and a position of the image capturing device C1. For example, when a distance between the image capturing device C1 and ground is equal to a positive value H and a focal point of the image capturing device C1 is on the ground. An image plane of the first image M1 becomes a trapezoid plane with a baseline greater than a topline. In other words, coordinates of the first image M1 correspond to camera (i.e., image capturing device C1) coordinates. Thus, axes of the camera coordinates may be tilted based on a position, a height, and a view angle of a charge coupled device (CCD) or a complementary metal-oxide semiconductor (CMOS) of the image capturing device C1. The processor 11 can use a first transfer function for converting the camera (i.e., image capturing device C1) coordinates of the first image M1 to first coordinates consistent with the world coordinate system. For example, the first transfer function can be a transfer matrix $H_i^{-1}$. The processor 11 can use the transfer matrix $H_i^{-1}$ for converting the camera (i.e., image capturing device C1) coordinates of the first image M1 to the first coordinates consistent with the world coordinate system. Specifically, the world coordinate system belongs to an absolute coordinate system. In other words, coordinates of an object under the world coordinate system are mapped to positions in the real world. Thus, axes of the world coordinate system are irrelevant to the position, the height, and the view angle of the CCD or CMOS of the image capturing device C1. Then, the processor 11 can use a second transfer function for converting the first coordinates to the image coordinates. The second image P1 can be generated according to the image coordinates. For example, the second transfer function can be a transfer matrix $H_v$. The processor 11 can use the transfer matrix $H_v$ for converting the first coordinates to the image coordinates. As previously mentioned, the image plane of the first image M1 is the trapezoid plane with the baseline greater than the topline. Thus, to calibrate the tilted image plane from 3-dimensional axes to 2-dimensional axes, the processor 11 can use the second transfer matrix $H_v$ for calibrating the tilted image plane of the first image M1 to a virtual image plane of the second image P1. However, any coordinates conversion method for converting the camera (i.e., image capturing device C1) coordinates of the first image M1 to the image coordinates of the second image P1 with the virtual image plane falls into the scope of the present invention. For example, the processor 11 can use the lookup table saved in the memory 12 for directly performing one-to-one coordinate mapping conversion. Also, the processor 11 can use a single transfer function (i.e., such as a Homography matrix $H_{iv}$) for directly converting the camera (i.e., image capturing device C1) coordinates to the image coordinates with respect to the virtual image plane.

As previously mentioned, the first image M1 can be converted to the second image P1 by the processor 11 of the panoramic image system 100. The second image P1 can be a front view or top view image. Particularly, all the first images M1 to M4 captured by the image capturing device C1 to C4 can be converted to the second images P1 to P4. For example, the first image M2 can be converted to the second image P2 by the processor 11. The first image M3 can be converted to the second image P3 by the processor 11. The first image M4 can be converted to the second image P4 by the processor 11.

Figure 3:
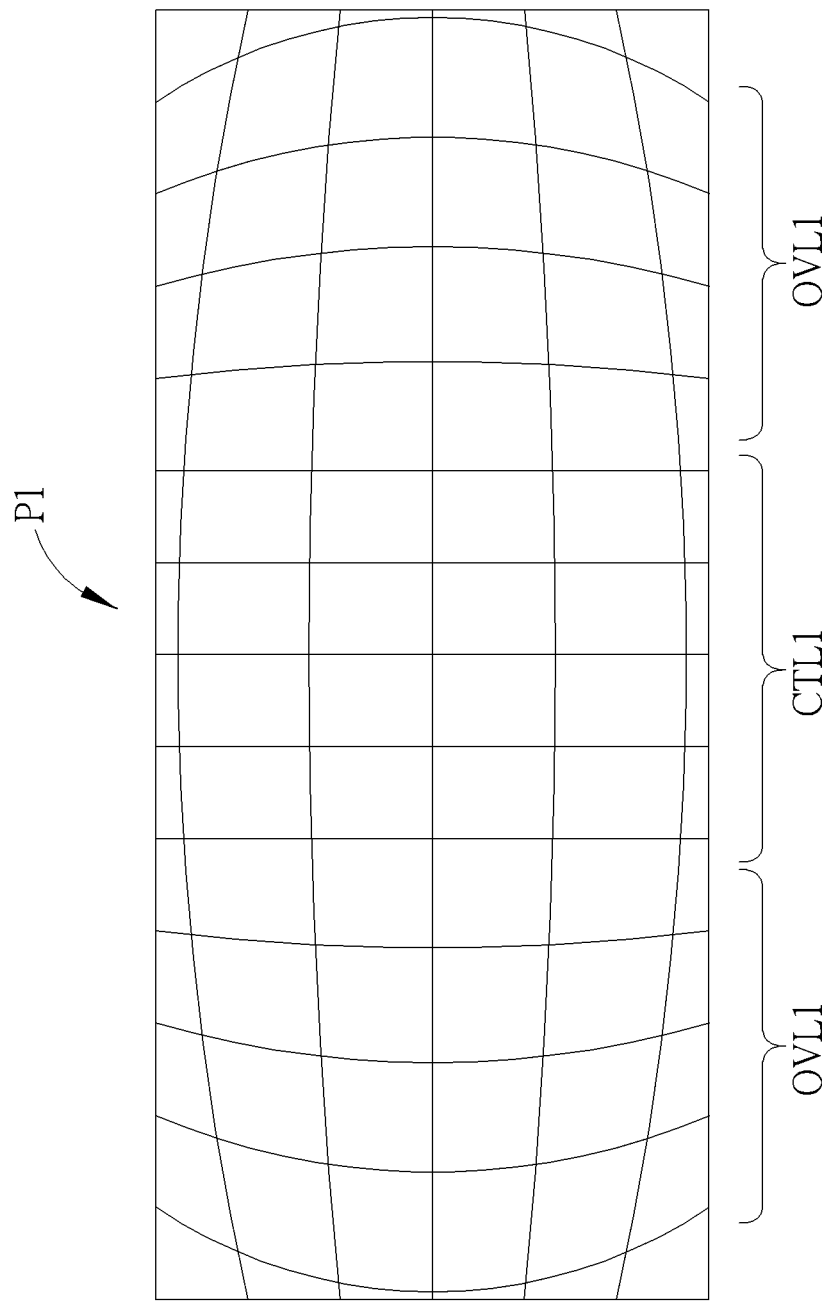
FIG. 3 is an illustration of a second image corresponding to an image capturing device of the panoramic image system in FIG. 1.

FIG. 3 is an illustration of a second image P1 corresponding to an image capturing device C1 of the panoramic image system 100. As previously mentioned, the image capturing devices C1 to C4 can be wide-angle lenses of the vehicle 10. However, although the wide-angle lenses can capture images with large angles of view, geometric distortion is unavoidable on sides of the images. Generally, the geometric distortion of the image captured by the wide-angle lens is called as barrel distortion. Therefore, the processor 11 can use an image un-distortion function for calibrating the geometric distortion of the second image P1. Unfortunately, even if the processor 11 uses the un-distortion function for calibrating the geometric distortion of the second image P1, the geometric distortion of the second image P1 may not be completely removed (or say, the second image P1 may not be completely recovered to a non-distortive image), especially in sides of the second image P1. When the geometric distortion occurs in the second image P1, since the geometric distortion is severe on the sides of the second image P1, information of pixels on the sides of the second image P1 is insufficient. Thus, when the un-distortion function is used for removing the geometric distortion on the sides of the second image P1, image quality may be decreased. Therefore, the geometric distortion on the sides of the second image P1 cannot be completely removed. As shown in FIG. 3, after the second image P1 is processed by using the un-distortion function, the geometric distortion of a central region CTL1 is significantly mitigated. However, the geometric distortion of a region OVL1 outside the central region CTL1 is still severe. Since the panoramic image system 100 stitches all second images P1 to P4 for generating the panoramic image, when the second images P1 to P4 are not optimized (i.e., severe geometric distortion), double-image blur effect is introduced to an image overlapped region, which is formed by stitching two adjacent second images (i.e., such as second images P1 and P2). Thus, an object in the panoramic image may be unidentified or blurred. To improve image quality of the panoramic image, the panoramic image system 100 uses the image registration process for optimizing each second image, especially in the region outside the central region. In the following, as illustrated in FIG. 3, the central region CTL1 is defined as a non-overlapped region when two adjacent second images are stitched. The region OVL1 (hereafter, say "image overlapped region OVL1") outside the central region CTL1 is defined as an image overlapped region when two adjacent second images are stitched.

Figure 4:
FIG. 4 is an illustration of a plurality of feature points of the second image identified by the panoramic image system in FIG. 1.

FIG. 4 is an illustration of a plurality of feature points A to D of the second image P2 identified by the panoramic image system 100. For simplicity, the second image P2 is introduced in FIG. 4. However, the processor 11 performs the image registration process for optimizing all second images P1 to P4. As previously mentioned, the second image P2 includes an image overlapped region, which is denoted as OVL2. The image overlapped region OVL2 is located on a left side region of the second image P2. Specifically, the geometric distortion is severe in the image overlapped region OVL2. As shown in FIG. 4, the image overlapped region OVL2 includes an object Obj. The object Obj is originally a rectangular object. After the geometric distortion is introduced, edges of the object Obj are distorted. The processor 11 identifies the feature points A to D of the second image P2. Here, the feature points A to D can be defined as vertices or turning points of the edges of the object Obj. In other words, the feature points A to D surround an image region of the object Obj. However, in the present invention, all possible two-dimensional lines or corner points can be regarded as the feature points for positioning the object Obj. In FIG. 4, coordinates of the feature point A are (x1,y1). Coordinates of the feature point B are (x2,y2). Coordinates of the feature point C are (x3,y3). Coordinates of the feature point D are (x4,y4). Coordinates of an intersecting point of a line from the feature point A to the feature point D and a line from the feature point B to the feature point C are (x5,y5).

Figure 5:
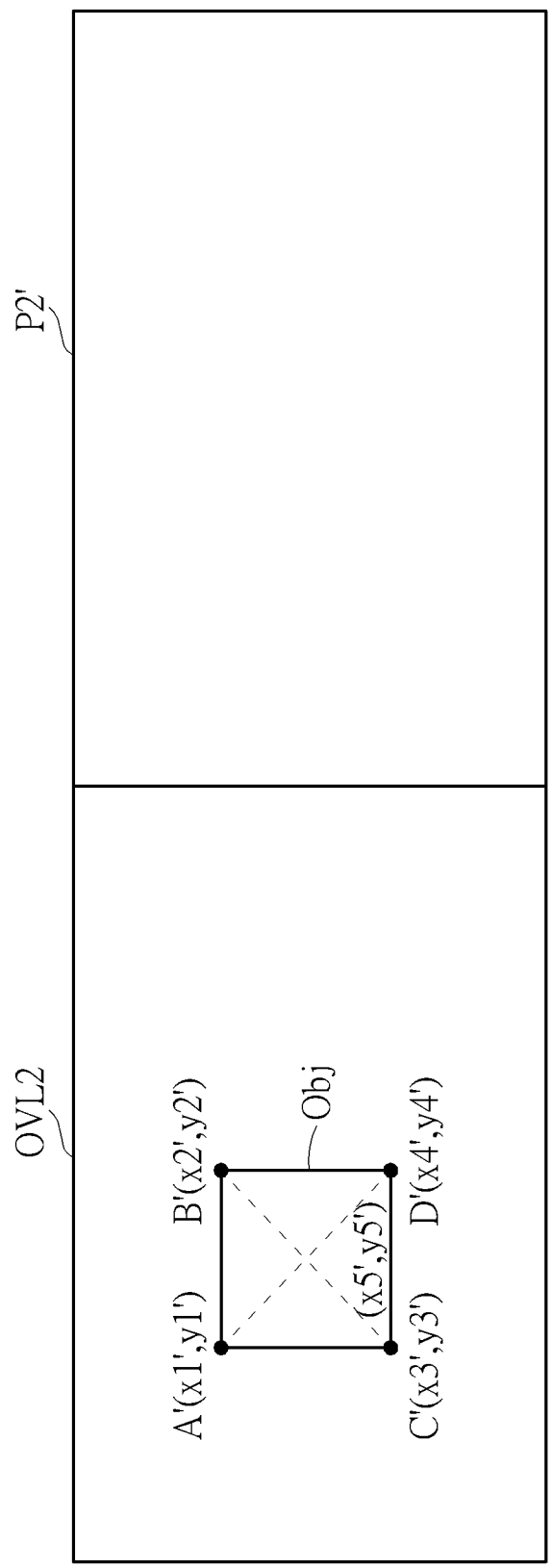
FIG. 5 is an illustration of a calibrated second image generated by calibrating feature points of the second image of the panoramic image system in FIG. 1.

FIG. 5 is an illustration of a calibrated second image P2' generated by calibrating feature points A to D of the second image P2 of the panoramic image system 100. In FIG. 4, since the severe geometric distortion is introduced to the image overlapped region OVL2, the coordinates of the feature points A to D can be regarded as four points with "distorted coordinates". The processor 11 can calibrate the coordinates of the feature points A to D to anchor coordinates consistent with the world coordinate system according to the world coordinate system. For example, the coordinates (x1,y1) of the feature point A in FIG. 4 can be calibrated to coordinates (x1',y1') of the feature point A' in FIG. 5. The coordinates (x2,y2) of the feature point B in FIG. 4 can be calibrated to coordinates (x2',y2') of the feature point B' in FIG. 5. The coordinates (x3,y3) of the feature point C in FIG. 4 can be calibrated to coordinates (x3',y3') of the feature point C' in FIG. 5. The coordinates (x4,y4) of the feature point D in FIG. 4 can be calibrated to coordinates (x4',y4') of the feature point D' in FIG. 5. The coordinates (x5,y5) of the intersecting point can be calibrated to coordinates (x5',y5') accordingly. Then, the processor 11 interpolates at least one pixel among the anchor coordinates (i.e., the calibrated coordinates A' to D') for generating the calibrated second image P2'. Here, the processor can use a linear interpolation process or a non-linear interpolation process for interpolating the at least one pixel. As previously mentioned, when the object Obj is originally a square-shaped object, the coordinates of the calibrated coordinates A' can be written as (x1',y1'). The coordinates of the calibrated coordinates B' can be written as (x1'+n,y1'). It implies that the position of the calibrated coordinates B' is shifted by n pixels in X-axis from the position of the calibrated coordinates A'. The coordinates of the calibrated coordinates C' can be written as (x1',y1'+n). It implies that the position of the calibrated coordinates C' is shifted by n pixels in Y-axis from the position of the calibrated coordinates A'. The coordinates of the calibrated coordinates D' can be written as (x1'+n,y1'+n). It implies that the position of the calibrated coordinates D' is shifted by n pixels in both Y-axis and X-axis from the position of the calibrated coordinates A'. Briefly, in FIG. 5, the processor 11 calibrates coordinates (x1,y1) to (x4,y4) of the feature points A to D for generating calibrated coordinates (x1',y1') to (x4',y4') of the calibrated feature points A' to D'. Then, the processor 11 can generate the calibrated second image P2' according to the calibrated coordinates (x1',y1') to (x4',y4') of the calibrated feature points A' to D'. By doing so, geometric distortion of the calibrated second image P2' can be greatly mitigated. Similarly, coordinates of the second images P1, P3, and P4 can also be calibrated. Then, the calibrated second images P1', P3', and P4' can be generated accordingly.

Figure 6:
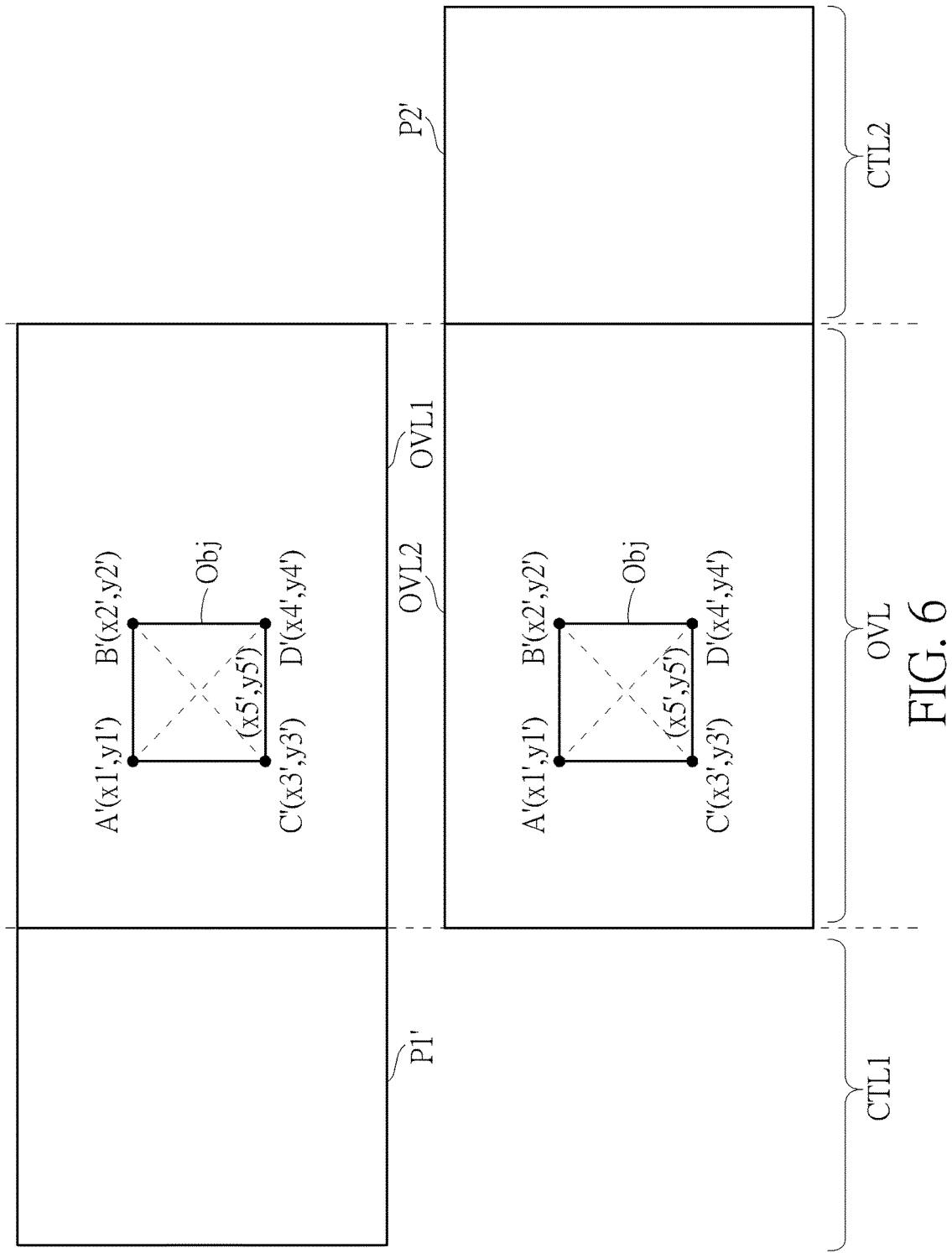
FIG. 6 is an illustration of a stitching process by using two adjacent calibrated second images of the panoramic image system in FIG. 1.

FIG. 6 is an illustration of a stitching process by using two adjacent calibrated second images P1' and P2' of the panoramic image system 100. As previously mentioned, the panoramic image system 100 can stitch the second images P1' to P4' for generating the panoramic image. For simplicity, two adjacent calibrated second images P1' and P2' are introduced for illustrating the stitching process. However, a method for calibrating the distorted coordinates to the calibrated coordinates according to the world coordinate system in FIG. 4 and FIG. 5 can be applied to all second images. In FIG. 6, the calibrated second image P1' corresponds to the front side of the vehicle 10. The calibrated second image P2' corresponds to the right side of the vehicle 10. Therefore, a position of the object Obj may be on an upper right corner of the vehicle 10. Thus, the object Obj appears in the image overlapped region OVL1 of the right side of the calibrated second image P1'. The object Obj appears in the image overlapped region OVL2 of the left side of the calibrated second image P2'. The coordinates of the object Obj in the image overlapped region OVL1 of the calibrated second image P1' are optimized by using the image registration process (i.e., coordinates calibration process). The coordinates of the object Obj in the image overlapped region OVL2 of the calibrated second image P2' are also optimized by using the image registration process. Thus, when the calibrated second image P1' and the calibrated second image P2' are stitched, the image overlapped region OVL1 and the image overlapped region OVL2 can be superimposed without introducing any aliasing contour. Thus, the stitching image can avoid the double-image blur effect of the object Obj.

Figure 7:
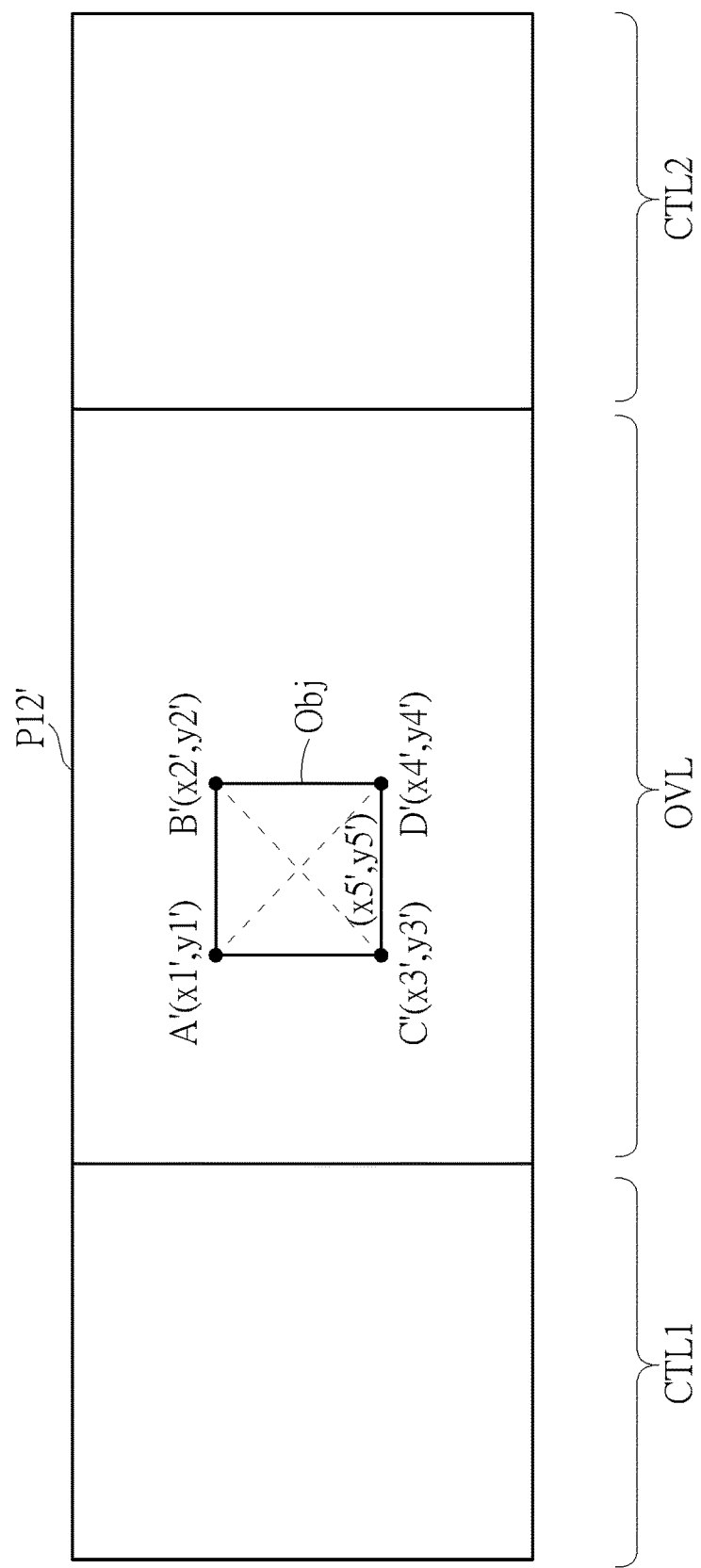
FIG. 7 is an illustration of a stitching image generated by stitching two adjacent calibrated second images of the panoramic image system in FIG. 1.

FIG. 7 is an illustration of a stitching image P12' generated by stitching two adjacent calibrated second images P1' and P2' of the panoramic image system 100. As previously mentioned, since the image overlapped region OVL1 and the image overlapped region OVL2 can be superimposed without introducing any aliasing contour, no double-image blur effect of the object Obj is introduced to the stitching image P12'. In other words, the stitching image P12' includes a non-overlapped region CTL1 of the calibrated second image P1', an image overlapped region OVL, and a non-overlapped region CTL2 of the calibrated second image P2'. In FIG. 7, the stitching image P12' is generated by stitching calibrated second images P1' and P2'. However, in the panoramic image system 100, the processor 11 can circularly stitch the calibrated second images P1' to P4'. By doing so, the panoramic image with an angle of view equal to 360 degrees can be generated by the panoramic image system 100.

Figure 8:
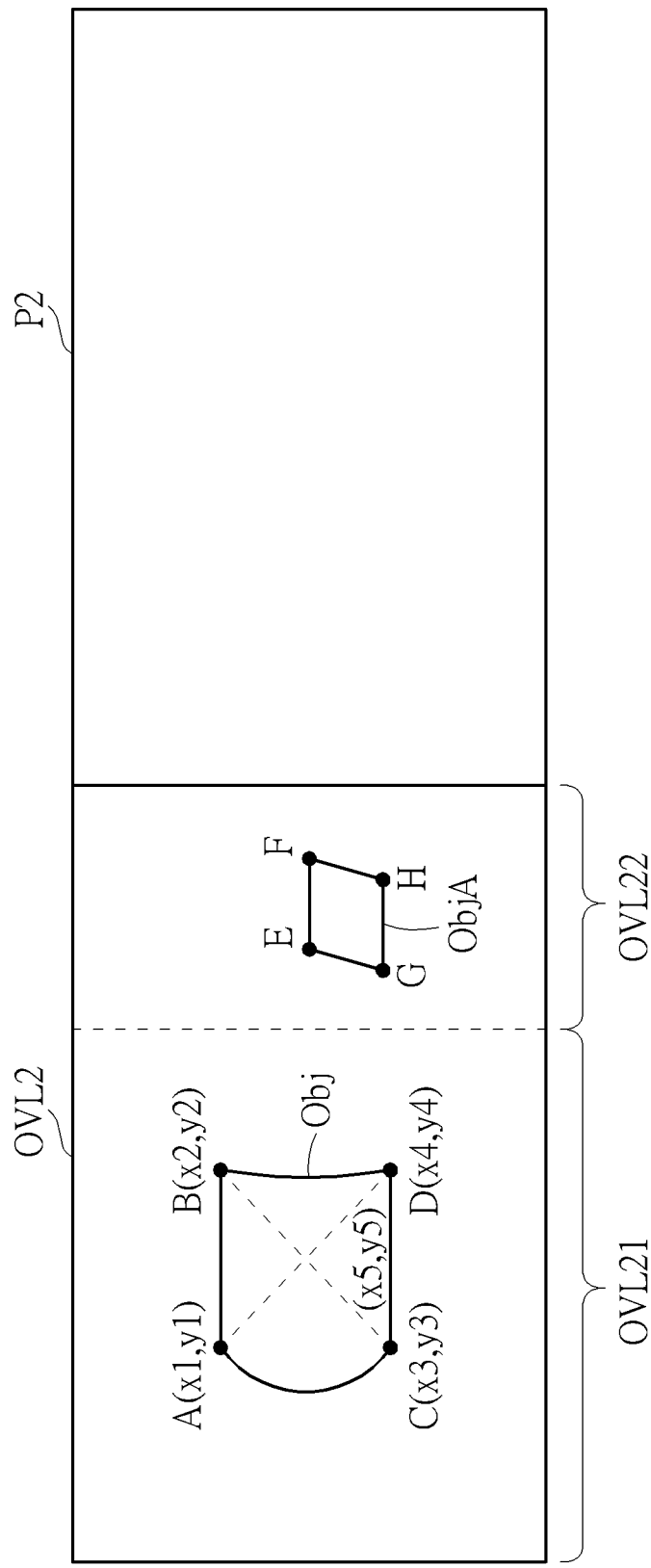
FIG. 8 is an illustration of feature points of objects identified by the panoramic image system in FIG. 1.

FIG. 8 is an illustration of feature points A to H of objects Obj and ObjA identified by the panoramic image system 100. As previously mentioned, the geometric distortion of the image overlapped region OVL2 of the second image P2 is introduced before the second image P2 is optimized by using the image registration process. Further, the geometric distortion is severe on sides of the second image P2. As shown in FIG. 8, the image overlapped region OVL2 of the second image P2 can be partitioned into two sub-regions, called as an image overlapped sub-region OVL21 and an image overlapped sub-region OVL22. Particularly, the image overlapped sub-region OVL22 is closer to the central region than the image overlapped sub-region OVL21. Thus, the geometric distortion of the image overlapped sub-region OVL21 is severer than the geometric distortion of the image overlapped sub-region OVL22. Here, the processor 11 can identify the feature points A to D of the object Obj and the feature points E to H of the object ObjA. To optimize coordinates of the feature points A to H of the image overlapped region OVL2, the processor 11 uses a transfer function or a lookup table for converting the coordinates of the feature points E to H (i.e., with slight geometric distortion) to image coordinates consistent with the world coordinate system. Similarly, the processor 11 uses another transfer function or another lookup table for converting the coordinates of the feature points A to D (i.e., with severe geometric distortion) to image coordinates consistent with the world coordinate system. The image coordinates can be coordinates with respect to the virtual image plane. In other words, the image overlapped sub-region OVL21 and the image overlapped sub-region OVL22 have different distortive degrees. To optimize the image overlapped sub-region OVL21 and the image overlapped sub-region OVL22 adaptively, the processor 11 can further use an interpolating function with appropriate weighting values or a transfer function with appropriate coefficients for processing image of each object located on corresponding image overlapped sub-region. By doing so, coordinates of objects located on different image overlapped sub-regions can be projected (or say, converted) to optimal image coordinates.

Figure 9:
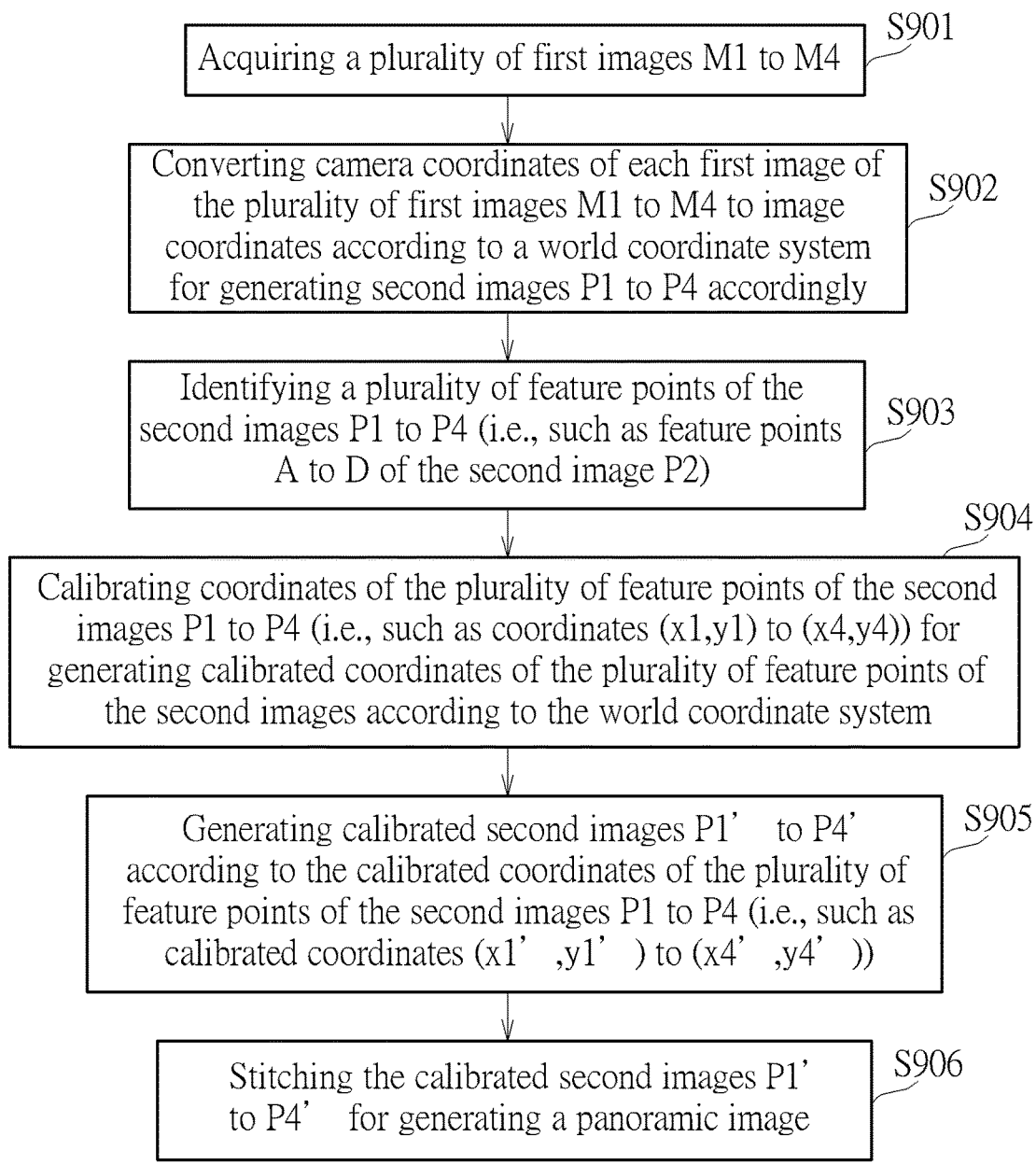
FIG. 9 is a flow chart of a panoramic image stitching method performed by the panoramic image system in FIG. 1.

FIG. 9 is a flow chart of a panoramic image stitching method performed by the panoramic image system 100. The panoramic image stitching method includes step S901 to step S906. Any reasonable amendment of step S901 to step S906 falls into the scope of the present invention. Step S901 to step S906 are illustrated below.

Step S901: acquiring a plurality of first images M1 to M4;
Step S902: converting camera coordinates of each first image of the plurality of first images M1 to M4 to image coordinates according to a world coordinate system for generating second images P1 to P4 accordingly;
Step S903: identifying a plurality of feature points of the second images P1 to P4 (i.e., such as feature points A to D of the second image P2);
Step S904: calibrating coordinates of the plurality of feature points of the second images P1 to P4 (i.e., such as coordinates (x1,y1) to (x4,y4)) for generating calibrated coordinates of the plurality of feature points of the second images according to the world coordinate system;
Step S905: generating calibrated second images P1' to P4' according to the calibrated coordinates of the plurality of feature points of the second images P1 to P4 (i.e., such as calibrated coordinates (x1',y1') to (x4',y4'));
Step S906: stitching the calibrated second images P1' to P4' for generating a panoramic image.

Operations of step S901 to step S906 are previously illustrated. Thus, they are omitted here. Briefly, images captured by the image capturing devices are processed by converting its camera coordinates to the image coordinates of the virtual image plane in step S901 and step S902. Then, coordinates of an image with geometric distortion can be calibrated by using the image registration process in step S903 to step S904 without executing step S901 and step S902 again. Thus, in step S906, since geometric distortion of the calibrated second images can be mitigated, the panoramic image stitched by the second images has a high image quality. Further, the panoramic image system 100 can process the captured images and generate the panoramic image in real time.

To sum up, the present invention discloses a panoramic image stitching method. The panoramic image stitching method can optimize several images captured by the image capturing devices. Further, the panoramic image without any distortion effect can be generated by stitching these processed images. Particularly, the panoramic image stitching method uses a partitioned image registration process for identifying all feature points of the image overlapped regions and then calibrating coordinates of the feature points. Thus, all coordinate offsets of the feature points caused by the geometric distortion can be removed. Since the coordinates of the feature points of the image overlapped regions are calibrated, the panoramic image generated by stitching the processed images can avoid a ghost effect (or say, a double-image blur effect). Thus, the panoramic image generated by using the panoramic image stitching method of the present invention has a high image quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A panoramic image stitching method comprising:
acquiring a plurality of first images;
converting camera coordinates of each first image to image coordinates according to a world coordinate system;
generating a second image according to the image coordinates;

identifying a plurality of feature points of the second image;

partitioning the second image into a plurality of sub-regions;

calibrating coordinates of the plurality of feature points of the second image for generating calibrated coordinates of the plurality of feature points of the second image by using an image registration process according to the world coordinate system after the second image is partitioned into the plurality of sub-regions;

generating a calibrated second image according to the calibrated coordinates of the plurality of feature points of the second image; and stitching a plurality of calibrated second images for generating a panoramic image;

wherein after the second image is partitioned into the plurality of sub-regions, the image registration process allocates the plurality of feature points into the plurality of sub-regions, the plurality of sub-regions have different geometric distortion degrees, the image registration process calibrates the coordinates of the plurality of feature points for recovering the plurality of sub-regions having the different geometric distortion degrees to a plurality of non-distortive sub-regions by using different transfer functions or interpolating functions corresponding to the different geometric distortion degrees.

2. The method of claim 1, wherein converting the camera coordinates of the each first image to the image coordinates according to the world coordinate system comprises:

converting the camera coordinates of the each first image to first coordinates consistent with the world coordinate system by using a first transfer function; and converting the first coordinates to the image coordinates by using a second transfer function.

3. The method of claim 1, wherein:

calibrating the coordinates of the plurality of feature points of the second image according to the world coordinate system for generating the calibrated coordinates of the plurality of feature points of the second image according to the world coordinate system comprises calibrating the coordinates of the plurality of feature points to a plurality of anchor coordinates consistent with the world coordinate system according to the world coordinate system; and generating the calibrated second image according to the calibrated coordinates of the plurality of feature points of the second image comprises interpolating at least one pixel among the plurality of anchor coordinates for generating the calibrated second image.

4. The method of claim 1, further comprising:

calibrating geometric distortion of the each first image by using an image un-distortion function.

5. The method of claim 1, wherein two adjacent first images of the plurality of first images comprise a common object so as to generate the panoramic image by stitching the plurality of calibrated second images after the plurality of first images are converted to the plurality of calibrated second images.

6. The method of claim 1, wherein an image region corresponds to an object of the second image, the image region comprises a plurality of feature points, and the image region is surrounded by the plurality of feature points.

7. A panoramic image system comprising:

a plurality of image capturing devices configured to acquire a plurality of first images;

a memory configured to save data of a world coordinate system;

a processor coupled to the plurality of image capturing devices and the memory and configured to process the plurality of first images; and an image output device coupled to the processor and configured to output a panoramic image;

wherein the processor converts the plurality of first images to a plurality of second images according to the world coordinate system, identifies a plurality of feature points of each second image, partitions the second image into a plurality of sub-regions, calibrates coordinates of the plurality of feature points of the second image by using an image registration process according to the world coordinate system after the second image is partitioned into the plurality of sub-regions, generates a calibrated second image according to calibrated coordinates, and stitches a plurality of calibrated second images for generating a panoramic image accordingly; and wherein after the second image is partitioned into the plurality of sub-regions, the image registration process allocates the plurality of feature points into the plurality of sub-regions, the plurality of sub-regions have different geometric distortion degrees, the image registration process calibrates the coordinates of the plurality of feature points for recovering the plurality of sub-regions having the different geometric distortion degrees to a plurality of non-distortive sub-regions by using different transfer functions or interpolating functions corresponding to the different geometric distortion degrees.

8. The panoramic image system of claim 7, wherein the memory has a lookup table configured to calibrate the coordinates of the plurality of feature points of the second image.

9. The panoramic image system of claim 7, wherein the plurality of image capturing devices are a plurality of wide-angle lenses of a vehicle, and the panoramic image is a surrounded top view image of the vehicle.

10. The panoramic image system of claim 9, wherein the memory has an image un-distortion function configured to calibrate geometric distortion of each first image.

* * * * *